US011556152B2

United States Patent
Pan et al.

(10) Patent No.: US 11,556,152 B2
(45) Date of Patent: Jan. 17, 2023

(54) KEYBOARD DEVICE CAPABLE OF PRODUCING MULTI-ZONE LIGHTING EFFECT AND ILLUMINATION MODULE THEREOF

(71) Applicant: Primax Electronics Ltd., Taipei (TW)

(72) Inventors: Ding-Hsiang Pan, Taipei (TW); Hui-Ling Lin, Taipei (TW); Yi-Chao Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 42 days.

(21) Appl. No.: 17/081,727

(22) Filed: Oct. 27, 2020

(65) Prior Publication Data

US 2022/0035416 A1 Feb. 3, 2022

Related U.S. Application Data (60) Provisional application No. 63/059,301, filed on Jul. 31, 2020.

(51) Int. Cl.
*G06F 1/16* (2006.01)
*H01H 13/83* (2006.01)
(Continued)

(52) U.S. Cl.
CPC ........ *G06F 1/1662* (2013.01); *F21V 33/0052* (2013.01); *G02B 6/0088* (2013.01);
(Continued)

(58) Field of Classification Search
CPC ... G06F 1/1662; G06F 3/0202; G02B 6/0001; G02B 6/0011; G02B 6/0013; G02B 6/0015; G02B 6/0018; G02B 6/0066; G02B 6/0073; G02B 6/0091; G02B 6/0035; G02B 6/004; G02B 6/0043; G02B 6/0068; G02B 6/0088; F21V 33/0052; F21V 33/0004; H01H 2203/052; H01H 13/704;
(Continued)

(56) References Cited

U.S. PATENT DOCUMENTS

9,022,590 B2 * 5/2015 Chen ...................... H01H 13/83
                                                        362/610
10,410,807 B2 * 9/2019 Tsai ..................... G02B 6/0055
(Continued)

*Primary Examiner* — Dismery Mercedes
(74) *Attorney, Agent, or Firm* — Kirton McConkie; Evan R. Witt (57) ABSTRACT

A keyboard device includes a keyboard module and an illumination module. The keyboard module includes plural first keys and at least one second key. The illumination module includes a light guide plate and a circuit board. The light guide plate includes plural first mapping zones and a second mapping zone. The first mapping zones are located under the corresponding first keys. The second mapping zone is located under the second key. Moreover, at least one side-view light-emitting element and at least one top-view light-emitting element are installed on the circuit board. The side-view light-emitting element emits a first light beam. The top-view light-emitting element emits a second light beam. The first light beam is extracted through the corresponding first mapping zone and transferred to the corresponding first key. The second light beam is transferred to the second key.

24 Claims, 10 Drawing Sheets

(51) Int. Cl.
*G06F 3/02* (2006.01)
*H01H 13/02* (2006.01)
*F21V 8/00* (2006.01)
*F21V 33/00* (2006.01)
*H01H 13/7065* (2006.01)

(52) U.S. Cl.
CPC ......... *G02B 6/0091* (2013.01); *G06F 3/0202* (2013.01); *H01H 13/023* (2013.01); *H01H 13/83* (2013.01); *F21V 2200/20* (2015.01); *H01H 13/7065* (2013.01)

(58) Field of Classification Search
CPC ......... H01H 2219/036; H01H 2219/06; H01H 2219/062; H01H 13/83; H01H 13/023; H01H 13/7065
See application file for complete search history.

(56) References Cited

U.S. PATENT DOCUMENTS

| | | | |
|---|---|---|---|
| 2009/0262081 A1* | 10/2009 | Chang | G06F 3/0202 362/616 |
| 2013/0049995 A1* | 2/2013 | Wu | H01H 13/83 341/22 |
| 2014/0168936 A1* | 6/2014 | Chen | H01H 13/023 362/23.03 |
| 2014/0340866 A1* | 11/2014 | Chen | H01H 13/83 362/23.03 |
| 2014/0367238 A1* | 12/2014 | Chen | H01H 13/83 200/5 A |
| 2020/0373107 A1* | 11/2020 | Chiu | H01H 13/83 |
| 2020/0401235 A1* | 12/2020 | Liang | H01H 13/704 |
| 2021/0157045 A1* | 5/2021 | Chen | H01H 13/14 |
| 2021/0280379 A1* | 9/2021 | Chen | H01H 3/125 |

* cited by examiner

KEYBOARD DEVICE CAPABLE OF PRODUCING MULTI-ZONE LIGHTING EFFECT AND ILLUMINATION MODULE THEREOF

CROSS-REFERENCE TO RELATED APPLICATION

This application claims priority to U.S. Provisional Patent Application No. 63/059,301 filed Jul. 31, 2020, the contents of which are incorporated herein by reference.

FIELD OF THE INVENTION

The present invention relates to a luminous keyboard device, and more particularly to a luminous keyboard device capable of producing a multi-zone lighting effect.

BACKGROUND OF THE INVENTION

Conventionally, a luminous keyboard device is equipped with a whole-piece light guide plate. The cooperation of the light guide plate and a side-view light-emitting element (e.g., a side-view LED) provides light beams to the keys. Since this backlight mechanism is unable to produce a color cycling effect, a wave spectrum effect, a breathing effect or a dynamic lighting effect, the function and commercial value of the keyboard device are not satisfied.

For meeting the requirement of the luminous keyboard board in the market, the luminous keyboard board needs to produce the multi-zone lighting effect. Moreover, it is necessary for some special keys to be individually illuminated.

SUMMARY OF THE INVENTION

For solving the drawbacks of the conventional technologies, the present invention provides an illumination module for a keyboard device. The keyboard device is capable of producing a multi-zone lighting effect and generating a color cycling effect, a wave spectrum effect, a breathing effect or any other appropriate dynamic lighting effect. Moreover, the keyboard device is equipped with top-view light-emitting elements under some special keys in order to individually provide light beams. Moreover, the lateral lighting mechanism of the side-view light-emitting elements is influenced or slightly influenced by the optical paths of the top-view light-emitting elements. Consequently, the technology of the present invention has the advantages and the lighting effects of the top-view light-emitting elements and side-view light-emitting elements.

In accordance with an embodiment of the present invention, a keyboard device is provided. The keyboard device includes a keyboard module and an illumination module. The keyboard module includes plural first keys and at least one second key. The illumination module is located under the keyboard module. The illumination module includes a light guide plate and a circuit board. The light guide plate includes plural first mapping zones and at least one second mapping zone. The first mapping zones are located under the corresponding first keys. The at least one second mapping zone is located under the at least one second key. Moreover, plural side-view light-emitting elements and at least one top-view light-emitting element are installed on the circuit board. The side-view light-emitting element emits a first light beam. The top-view light-emitting element emits a second light beam. The first light beam is extracted through the corresponding first mapping zone and transferred to the corresponding first key. The second light beam is directly transferred to the second key.

In an embodiment, the circuit board is located under the light guide plate, and the light guide plate includes plural openings. The at least one side-view light-emitting element and the at least one top-view light-emitting element are accommodated within the corresponding openings.

In an embodiment, the second mapping zone includes an opening, and the top-view light-emitting element is accommodated within the opening.

In an embodiment, each first mapping zone of the light guide plate is equipped with plural light-extraction structures. Moreover, a number, a component density or a depth of the light-extraction structures is adjusted according to a distance between the first mapping zone and the side-view light-emitting element.

In an embodiment, the light-extraction structures are light-guiding dots or microstructures.

In an embodiment, each first mapping zone of the light guide plate is equipped with plural light-extraction structures. In every two adjacent first mapping zones, the first mapping zone farther from the corresponding side-view light-emitting element has a larger number, a larger component density or a larger depth of the light-extraction structures.

In an embodiment, the light-extraction structures are light-guiding dots or microstructures.

In an embodiment, the second mapping zone of the light guide plate is not equipped with light-extraction structures.

In an embodiment, the at least one side-view light-emitting element on the circuit board includes plural side-view light-emitting elements, the light guide plate includes plural slots, and the light guide plate is divided into plural light-guiding zones through the slots. Each light-guiding zone is aligned with at least one of the plural side-view light-emitting elements.

In an embodiment, the circuit board further includes at least one driving IC, and currents and PWM signals corresponding to the plural side-view light-emitting elements and the at least one top-view light-emitting element are controlled by the at least one driving IC.

In an embodiment, the at least one second key includes four keys "W", "A", "S" and "D".

In an embodiment, the light guide plate includes plural slots, and the light guide plate is divided into plural light-guiding zones through the slots. Moreover, four second mapping zones of the light guide plate corresponding to the four keys "W", "A", "S" and "D" belong to two of the plural light-guiding zones through one of the plural slots.

In an embodiment, the light guide plate includes plural slots, and the light guide plate is divided into plural light-guiding zones through the slots. Moreover, three second mapping zones of the light guide plate corresponding to three keys "W", "A" and "D" are located near one of the plural slots.

In an embodiment, the keyboard further includes a partial-light-shielding layer between the light guide plate and the keyboard module, and the partial-light-shielding layer includes at least one light-transmissible region and at least one light-blocking region. The at least one second mapping region is covered by the at least one light-blocking region along a vertical direction.

In an embodiment, the light-blocking region includes at least one opening, and the at least one top-view light-emitting element is exposed outside the at least one opening.

In an embodiment, the light guide plate includes plural slots, and the light guide plate is divided into plural light-guiding zones through the slots. The keyboard device further includes a reflective layer. The light guide plate is clamped between the partial-light-shielding layer and the reflective layer. The light-shielding layer and the reflective layer are attached on each other through the slots.

In an embodiment, the keyboard device further includes a partial-light-shielding layer between the light guide plate and the keyboard module, and the partial-light-shielding layer includes at least one light-transmissible region and at least one light-blocking region. The at least one side-view light-emitting element is covered by the light-blocking region along a vertical direction.

In an embodiment, the light guide plate includes plural slots, and the light guide plate is divided into plural light-guiding zones through the slots. The keyboard device further includes a reflective layer. The light guide plate is clamped between the partial-light-shielding layer and the reflective layer. The light-shielding layer and the reflective layer are attached on each other through the slots.

In accordance with another embodiment of the present invention, an illumination module for a keyboard module is provided. The keyboard module includes plural first keys and at least one second key. The illumination module includes a partial-light-shielding layer, a reflective layer and a circuit board. The partial-light-shielding layer includes at least one light-transmissible region and at least one light-blocking region. The light guide plate is located under the partial-light-shielding layer. The light guide plate includes plural first mapping zones and at least one second mapping zone. The light guide plate includes plural first openings. The reflective layer is located under the light guide plate. The reflective layer includes plural second openings. The circuit board is located under the reflective layer. Moreover, plural side-view light-emitting elements and at least one top-view light-emitting element are installed on the circuit board, and the at least one side-view light-emitting element and the at least one top-view light-emitting element are accommodated within the corresponding first openings and the corresponding second openings. The side-view light-emitting element emits a first light beam. The top-view light-emitting element emits a second light beam. The first light beam is guided by the light guide plate, transferred through the first mapping zone and the light-transmissible region, and transferred to the corresponding first key. The second light beam is transferred to the second key.

In an embodiment, each first mapping zone of the light guide plate is equipped with plural light-extraction structures, and the light-extraction structures are light-guiding dots or microstructures. The second mapping zone of the light guide plate is not equipped with light-extraction structures.

In an embodiment, the at least one side-view light-emitting element is covered by the light-blocking region along a vertical direction.

In an embodiment, the at least one second mapping region is covered by the at least one light-blocking region along a vertical direction.

In an embodiment, the light-blocking region includes at least one third opening, and the at least one light-blocking region is exposed outside the at least one first opening, the at least one second opening and the at least one third opening.

In an embodiment, the light guide plate includes plural slots, and the light guide plate is divided into plural light-guiding zones through the slots. The light-shielding layer and the reflective layer are attached on each other through the slots.

In an embodiment, the circuit board further includes at least one driving IC. Moreover, currents and PWM signals corresponding to the plural side-view light-emitting elements and the at least one top-view light-emitting element are controlled by the at least one driving IC.

In an embodiment, the at least one second key includes four keys "W", "A", "S" and "D".

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
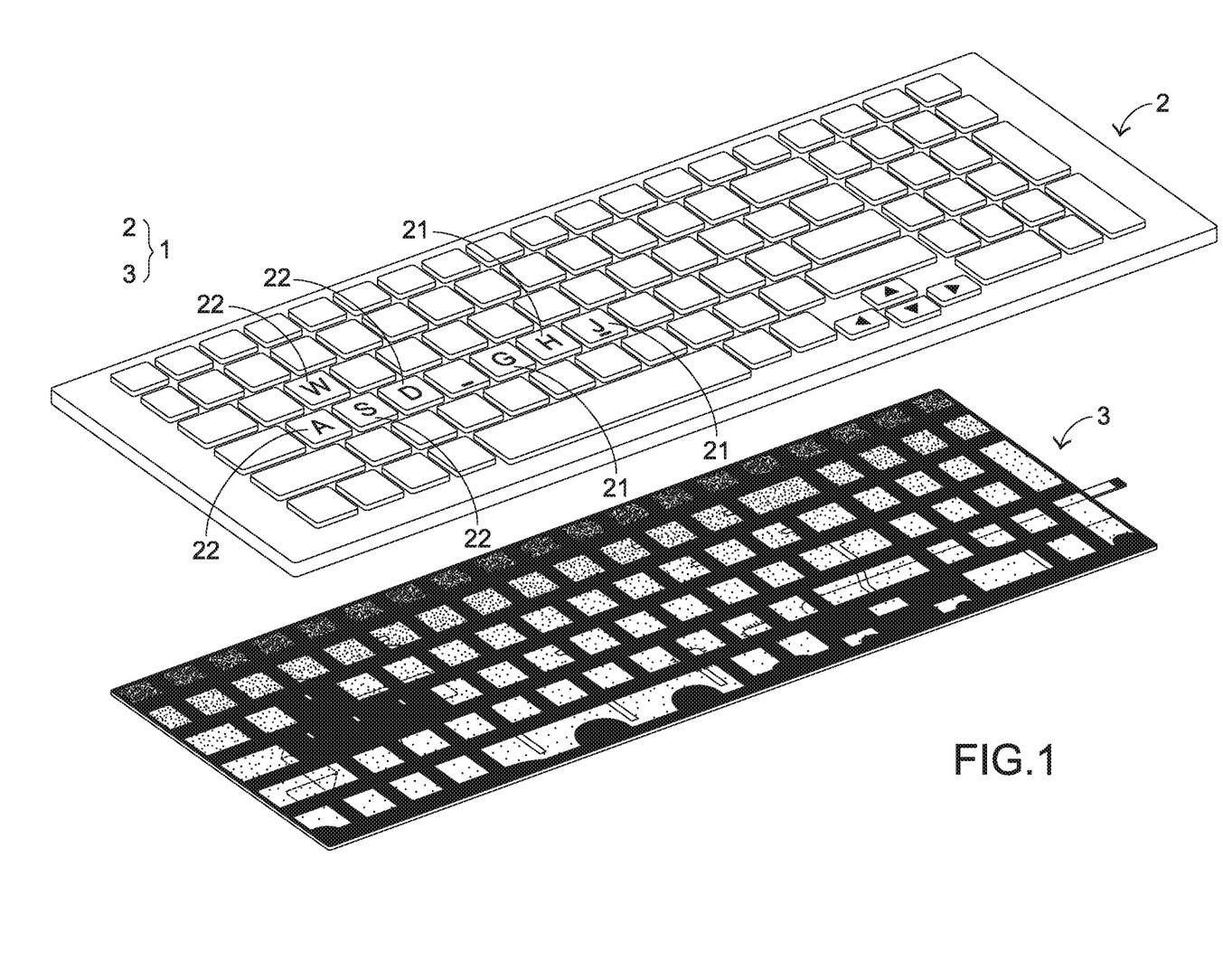
FIG. 1 is a schematic exploded view illustrating a keyboard module and an illumination module of a keyboard device according to an embodiment of the present invention.

FIG. 1 is a schematic exploded view illustrating a keyboard module and an illumination module of a keyboard device according to an embodiment of the present invention. As shown in FIG. 1, the keyboard device 1 comprises a keyboard module 2 and an illumination module 3. The illumination module 3 is located under the keyboard module 2. The illumination module 3 emits light beams upwardly to the keyboard module 2. The keyboard module 2 comprises plural keys. The structures of the keys are similar to those of the general keyboard. Each key comprises a keycap, a guiding element and a restoring structure. For example, the guiding element is a scissor-type connecting element, a butterfly-type connecting element, a crater structure, or the like. When the keycap is moved upwardly or downwardly, the keycap is stably moved along a specified path under the assistance of the guiding element. The restoring structure is a rubber dome structure or an elastic structure. In response to the elastic force of the restoring structure, the depressed key can be returned to its original position.

In an embodiment, the keys of the keyboard module 2 are classified into first keys 21 and second keys 22. The second keys 22 are special keys. The illuminating systems are determined according to the types of the keys. For example, the four keys "W", "A", "S" and "D" that can be used in replace of the arrow keys when playing video games are defined as the second keys 22. Moreover, plural top-view light-emitting elements 312 are respectively located under the second keys 22 (see FIG. 3). The light beams (also referred as second light beams) emitted by the top-view light-emitting elements 312 are directly projected on the second keys 22. The keys of the keyboard module 2 excluding the second keys 22 are defined as the first keys 21. For example, the keys G, H and J as shown in FIG. 1 are the first keys 21. The side-view light-emitting elements 311 and a light guide plate 33 (see FIG. 2) cooperate to provide a required backlight or light beams (also referred as first light beams) to the first keys 21.

It is noted that the examples of the second keys 22 are not restricted. For example, the directional keys as shown in FIG. 1 are the second keys 22. Alternatively, other keys, hot keys, shortcut keys or control keys may be served as the second keys. It is noted that the number of the second keys is not restricted. That is, the keyboard module may comprise one or plural second keys.

In some situations, the illumination module 3 does not provide the backlight to the first keys 21, but the illumination module 3 only provides the backlight to the second keys 22. Consequently, the positions of the second keys 22 can be quickly and clearly recognized by the user. Moreover, in the keyboard device of the present invention, the backlight provided to the first keys 21 can produce a color cycling effect, a wave spectrum effect, a breathing effect or any other appropriate dynamic lighting effect.

Figure 2:
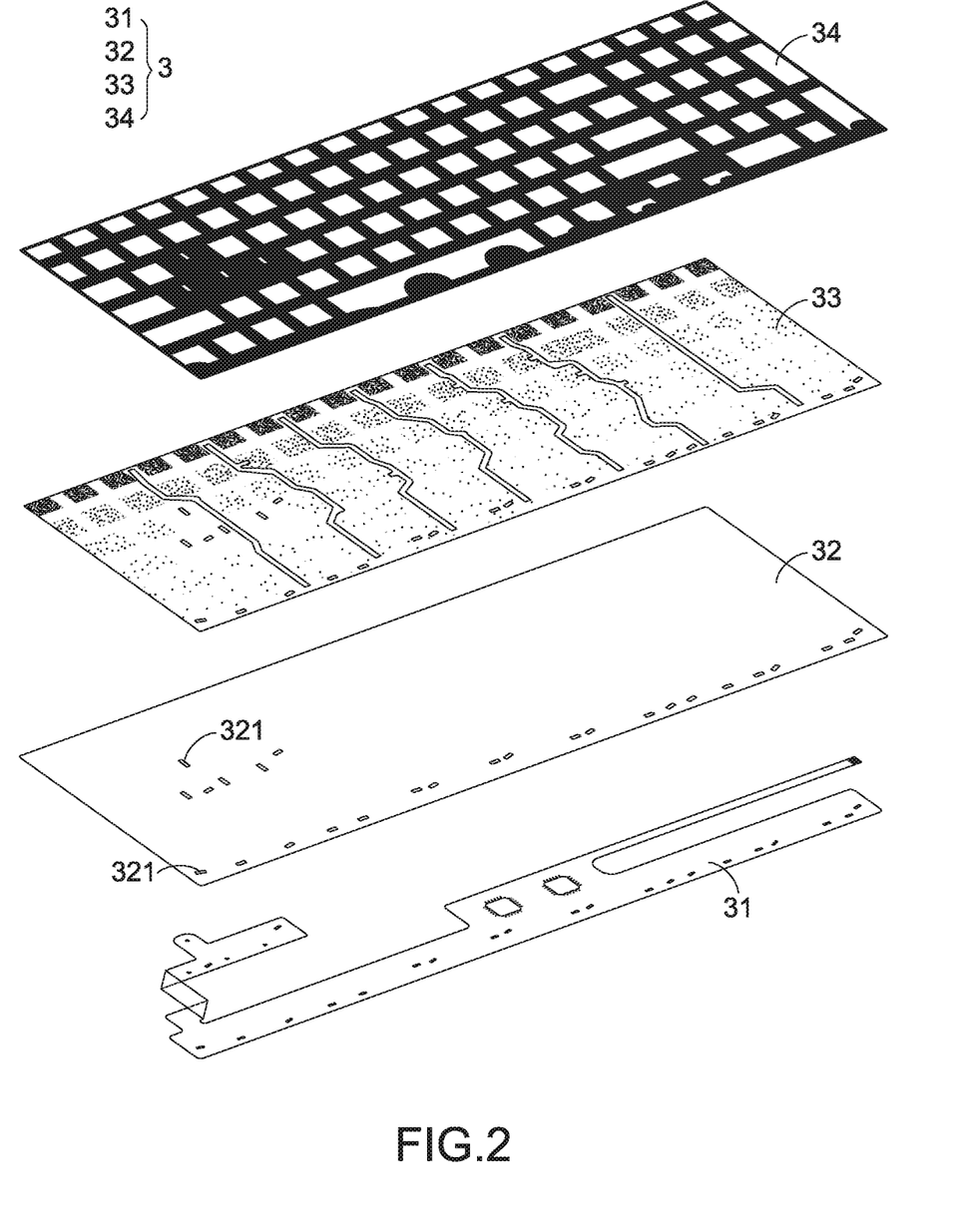
FIG. 2 is a schematic exploded view illustrating the illumination module of the keyboard device according to the embodiment of the present invention.

FIG. 2 is a schematic exploded view illustrating the illumination module of the keyboard device according to the embodiment of the present invention. From bottom to top, a circuit board 31, a reflective layer 32, a light guide plate 33 and a partial light-shielding layer 34 of the illumination module 3 are sequentially shown. The circuit board 31 is located under the reflective layer 32. The reflective layer 32 is located under the light guide plate 33. The light guide plate 33 is located under the partial light-shielding layer 34.

Figure 3:
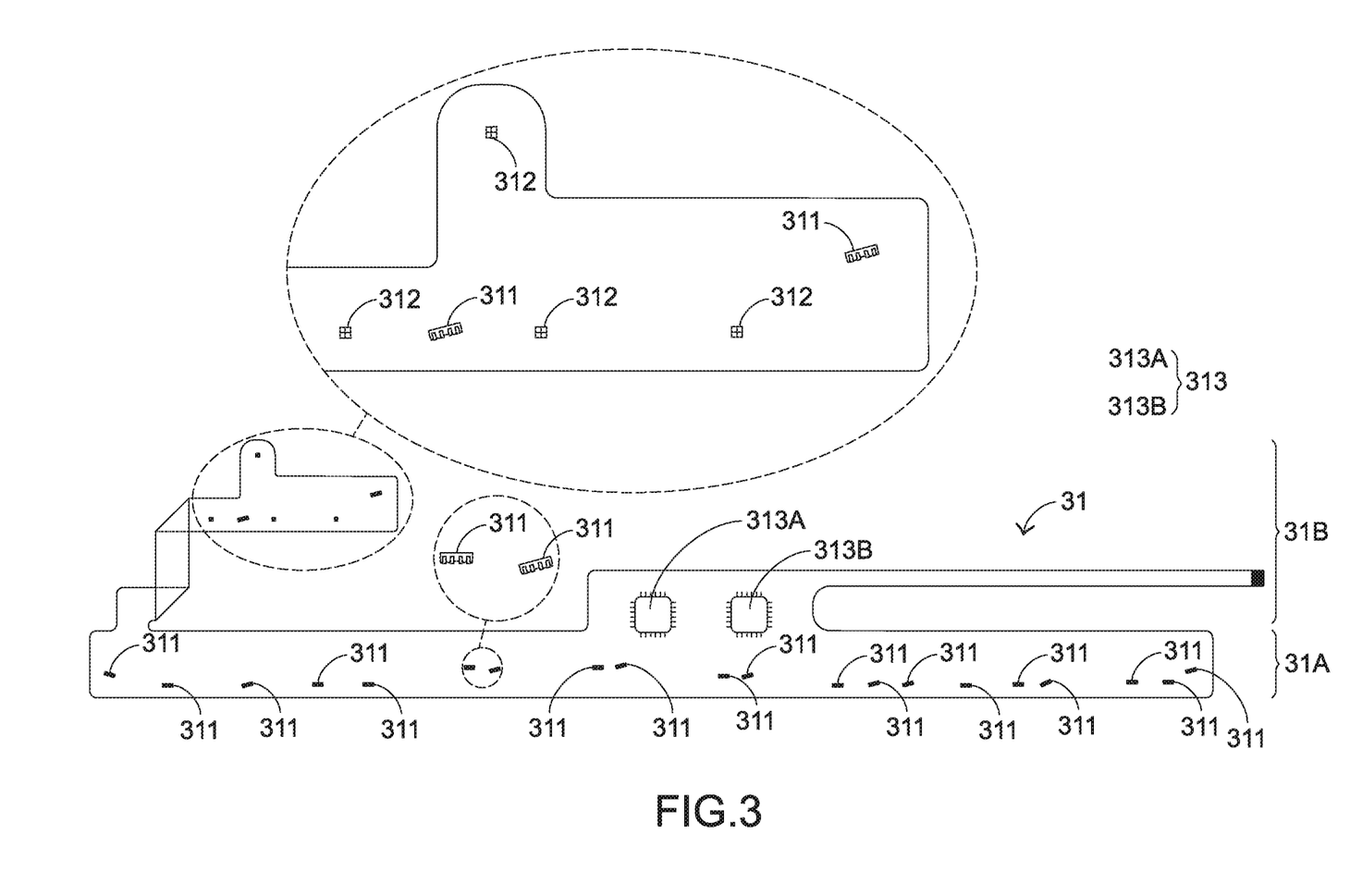
FIG. 3 is a schematic top view illustrating the circuit board of the illumination module of the keyboard device according to the embodiment of the present invention.

FIG. 3 is a schematic top view illustrating the circuit board of the illumination module of the keyboard device according to the embodiment of the present invention. As shown in FIG. 3, the circuit board 31 comprises at least one side-view light-emitting element 311, at least one top-view light-emitting element 312 and a driving IC 313. For example, the at least one side-view light-emitting element 311 and the at least one top-view light-emitting element 312 are monochromatic LEDs or polychromatic LEDs. The at least one side-view light-emitting element 311 and the driving IC 313 are electrically connected with each other through the corresponding trace pattern (not shown). Similarly, the at least one top-view light-emitting element 312 and the driving IC 313 are electrically connected with each other through the corresponding trace pattern (not shown). The currents and the PWM signals corresponding to the at least one side-view light-emitting element 311 and the at least one top-view light-emitting element 312 can be individually controlled by the driving IC 313. Consequently, the special lighting effect can be smoothly generated. For example, the cooperation of the multi-zone lighting design of the light guide plate 33 can produce a color cycling effect, a wave spectrum effect, a breathing effect or any other appropriate dynamic lighting effect.

Figure 4A:
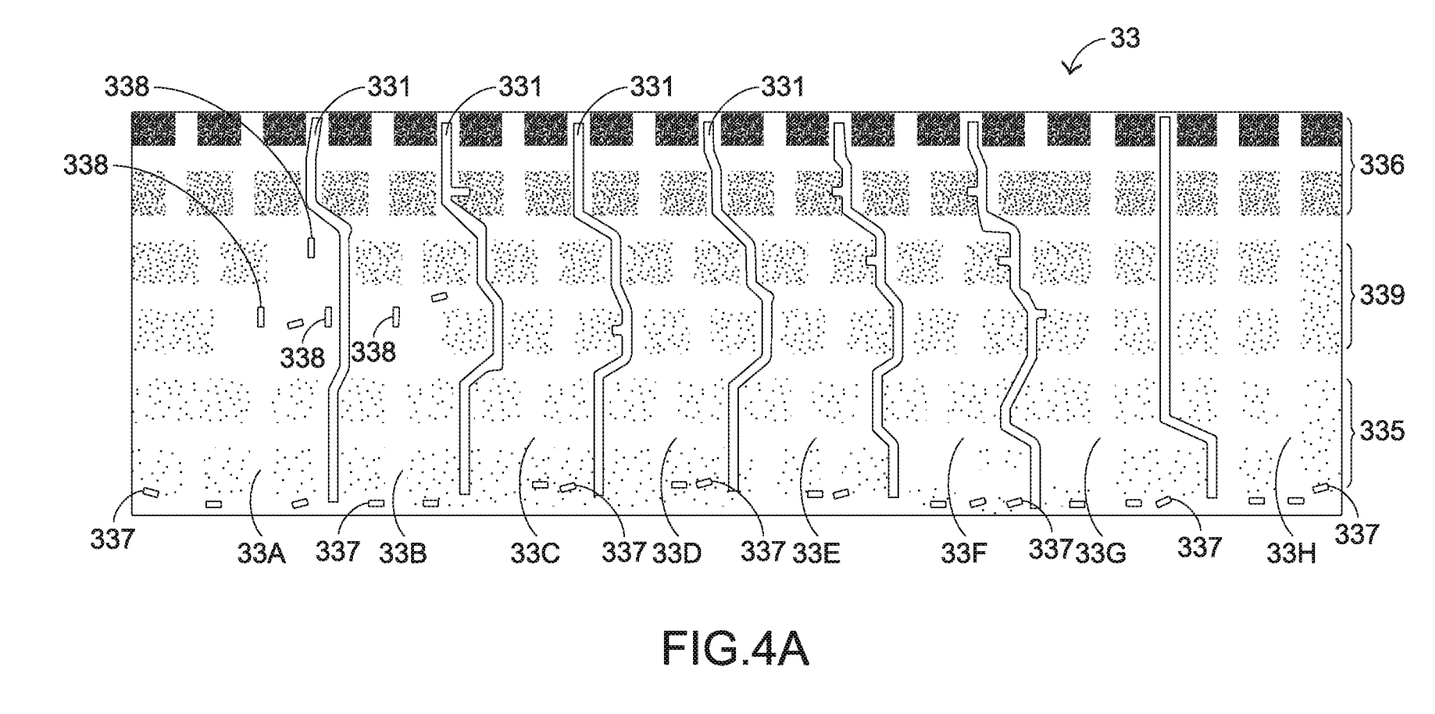
FIG. 4A is a schematic top view illustrating the light guide plate of the illumination module of the keyboard device according to the embodiment of the present invention.
Figure 4B:
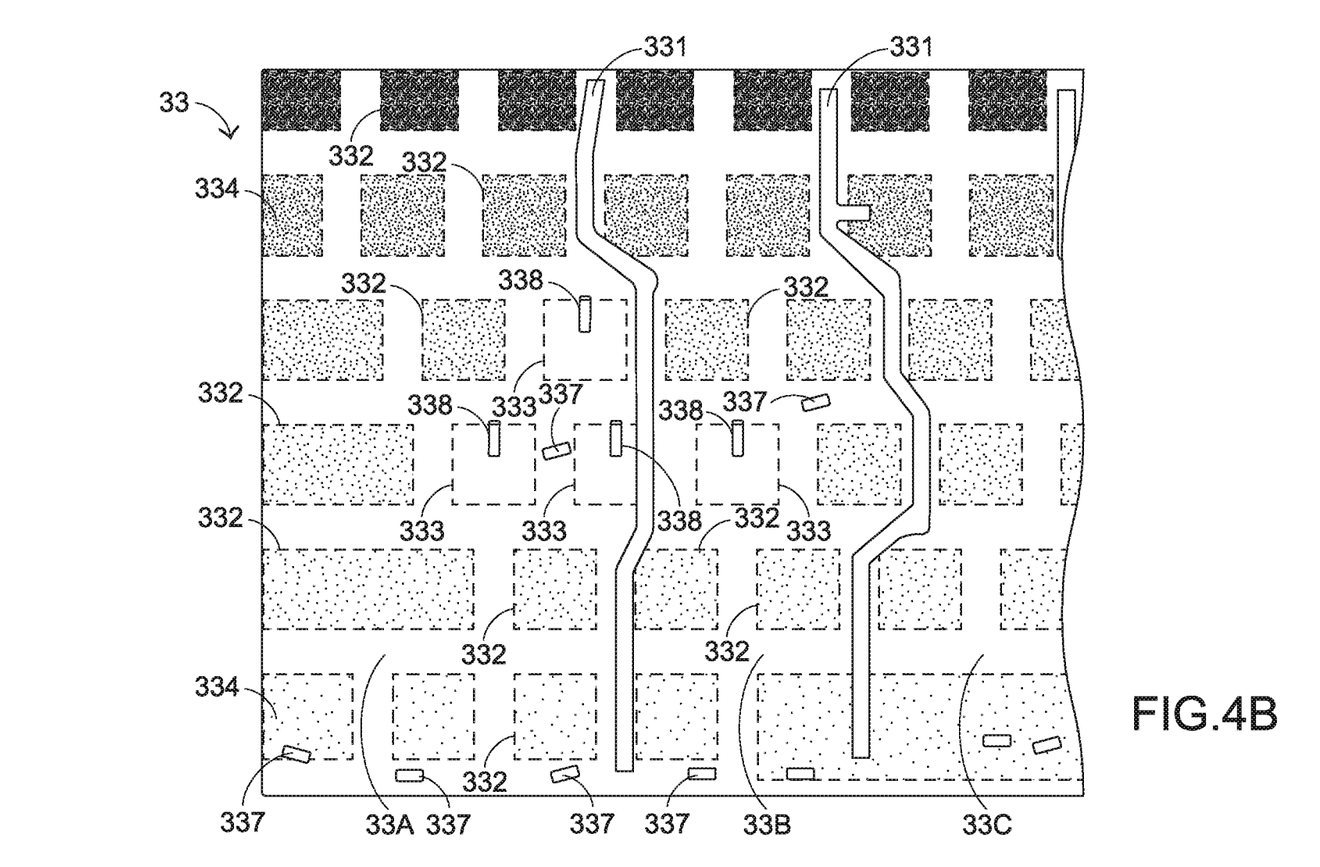
FIG. 4B is a schematic top view illustrating an enlarged portion of the light guide plate as shown in FIG. 4A.

Please refer to FIGS. 4A and 4B. FIG. 4A is a schematic top view illustrating the light guide plate of the illumination module of the keyboard device according to the embodiment of the present invention. FIG. 4B is a schematic top view illustrating an enlarged portion of the light guide plate as shown in FIG. 4A. The light guide plate 33 of the illumination module 3 is divided into plural light-guiding zones from left to right along a horizontal direction. For example, the light guide plate 33 as shown in FIG. 4A is divided into eight light-guiding zones 33A, 33B, 33C, 33D, 33E, 33F, 33G and 33H. Every two adjacent ones of the light-guiding zones 33A~33H are separated from each other through a slot 331. However, the upper portions or the lower portions of every two adjacent ones of the light-guiding zones 33A~33H are coupled with each other. In other words, the light guide plate 33 is an integral structure.

In an embodiment, the light guide plate 33 comprises plural mapping zones corresponding to the keys of the keyboard module 2. For example, the light guide plate 33 comprises plural first mapping zones 332 and plural second mapping zones 333. The first mapping zones 332 are located under the corresponding first keys 21. The second mapping zones 333 are located under the second keys 22 (e.g., the keys "W", "A", "S" and "D"). Moreover, plural light-extraction structures 334 are formed on the top surfaces or the bottom surfaces of the light guide plate 33. For example, the light-extraction structures 334 are microstructures (e.g., trenches or blind holes) or light-guiding dots. When the light beams (e.g., the first light beams) are transferred through or irradiated on the light-extraction structures 334, the light beams can be extracted. The number, the component density or the depth of the light-extraction structures 334 on the light guide plate 33 may be adjusted according to the distances between the corresponding first mapping zones 332 and the corresponding side-view light-emitting elements 311.

Since the top-view light-emitting elements 312 are located under the second keys 22, the second mapping zones 333 of the light guide plate 33 corresponding to the second keys 22 are not equipped with the light-extraction structures 334. The top-view light-emitting elements 312 can directly and upwardly emit the light beams (e.g., the second light beams) to the second keys 22. Consequently, it is not necessary for the side-view light-emitting elements 311 and the light-extraction structures 334 to provide the backlight to the second keys 22.

As mentioned above, the second mapping zones 333 of the light guide plate 33 corresponding to the second keys 22 are not equipped with the light-extraction structures 334. Consequently, the light beams emitted by the side-view light-emitting elements 311 on the lower portion 31A of the circuit board 31 (i.e., the first light beams) can be directly transferred through the second mapping zones 333 and not extracted. That is, the first light beams can be transferred to the farther positions (or downstream positions) more smoothly and provided to other ordinary keys. Even if the keyboard device comprises the top-view light-emitting elements 312 under some special keys, the lighting mechanism of the ordinary key (i.e., the cooperation of the side-view light-emitting elements 311 and the light guide plate 33) is not influenced. Consequently, the benefit of the vertical illumination of the top-view light-emitting element and the benefit of the horizontal diffusion illumination of the side-view light-emitting element can be achieved.

Please refer to FIGS. 4A and 4B again. In an embodiment, the second mapping zones 333 of the light guide plate corresponding to the second keys 22 (e.g., the keys "W", "A", "S" and "D") belong to two different light-guiding zones 33A and 33B, which are separated through a slot 331. Alternatively, the second mapping zones 333 of the light guide plate corresponding to the second keys 22 (e.g., the three keys "W", "A" and "D") are located beside the slot 331. Since the second mapping zones 333 are located at the borders or edges of the light-guiding zones 33A and 33B, the second light beams L2 emitted by the top-view light-emitting elements 312 will not diffuse to or influence the nearby first mapping zones 332. In addition, the first light beams L1 from the side-view light-emitting elements 311 are not obviously interfered by the second mapping zones 333 (including the openings 338) of the light guide plate 33.

Figure 5:
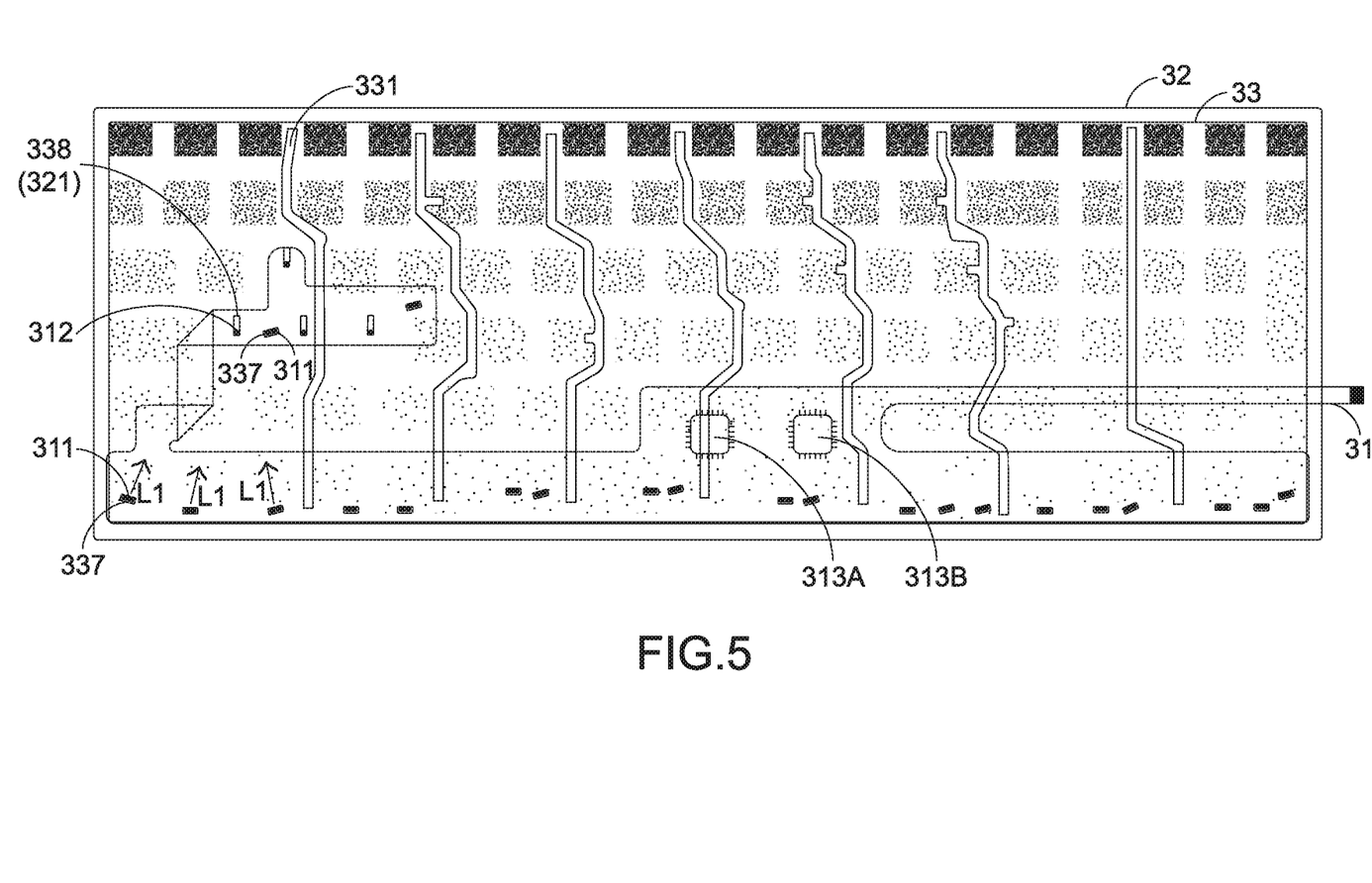
FIG. 5 is a schematic top view illustrating the combination of the circuit board, a reflective layer and the light guide plate of the illumination module according to the embodiment of the present invention.

Please refer to FIGS. 3, 4A, 4B and 5. FIG. 5 is a schematic top view illustrating the combination of the circuit board, a reflective layer and the light guide plate of the illumination module according to the embodiment of the present invention. Especially, the detailed structures of the circuit board 31 and the light guide plate 33 can be clearly shown in FIG. 5. As shown in these drawings, plural side-view light-emitting elements 311 are installed on a lower portion 31A of the circuit board 31. These side-view light-emitting elements 311 emit the light beams in the direction from the lower portion 31A to the upper portion 31B. Moreover, the first mapping zones 332 are aligned with the corresponding first keys 21 (i.e., the ordinary keys). Consequently, the number, the component density or the depth of the light-extraction structures 334 on the light guide plate 33 may be adjusted according to the distances between the corresponding first mapping zones 332 and the corresponding side-view light-emitting elements 311. As the first mapping zone 332 is closer to the corresponding side-view light-emitting element 311, the number, the component density and the depth of the light-extraction structures 334 are smaller. As the first mapping zone 332 is farther from the corresponding side-view light-emitting element 311, the number, the component density and the depth of the light-extraction structures 334 are larger. The arrangement of the light-extraction structures 334 may be varied. For example, in every two adjacent mapping zones, the number, the component density or the depth of the light-extraction structures 334 may be adjusted according to the distances between the first mapping zones 332 and a specified side-view light-emitting element 311. In case that a specified first mapping zone 332 of two adjacent first zones 332 is farther from the specified side-view light-emitting element 311, the number, the component density and the depth of the light-extraction structures 334 are larger. Whereas, in case that a specified first mapping zone 332 of two adjacent first zones 332 is closer to the specified side-view light-emitting element 311, the number, the component density and the depth of the light-extraction structures 334 are smaller.

Due to the above design, the light beams from the side-view light-emitting element 311 can be smoothly transferred to the farther original keys, and the light amount of the light beams can be uniformly distributed to the ordinary keys. Please refer to the enlarged portion of the light guide plate 33 as shown on FIG. 4B. For example, the light-extraction structures 334 on the first mapping zone 332 are light-guiding dots. As the first mapping zone 332 is closer to the lower portion 335 of the light guide plate 33 (i.e., closer to the corresponding side-view light-emitting element 311), the number and the component density of the light-guiding dots are smaller. As the first mapping zone 332 is closer to the upper portion 336 of the light guide plate 33 (i.e., farther from the corresponding side-view light-emitting element 311), the number and the component density of the light-guiding dots are larger.

Please refer to FIGS. 3, 4A, 4B and 5 again. In an embodiment, the light guide plate 33 has plural openings 337 corresponding to the side-view light-emitting elements 311, and the reflective layer 32 has plural openings 321 corresponding to the side-view light-emitting elements 311. When the light guide plate 33 and the reflective layer 32 are stacked on each other (see FIG. 5), the side-view light-emitting elements 311 are accommodated within the openings 337 and the openings 321. Consequently, the thickness of the illumination module 3 is not increased. Moreover, the light beams from the side-view light-emitting elements 311 can be transferred through the openings 337 of the light guide plate 33 and horizontally introduced into the light guide plate 33.

After the light guide plate 33, the reflective layer 32 and the circuit board 31 are stacked on each other, each of the light-guiding zones 33A~33H of the light guide plate 33 cooperate with at least one side-view light-emitting element 311 of the circuit board 31. As shown in FIG. 5, each of the light-guiding zones 33A~33H on the light guide plate 33 is aligned with two, three or four side-view light-emitting elements 311 of the circuit board 31. In case that each key cooperates with one side-view light-emitting element 311 according to the width of the key, the lighting effect is optimized. That is, in case that a specified light-guiding zone covers the width of two or three keys, the specified light-guiding zone cooperates with two or three side-view light-emitting elements 311.

Moreover, the second mapping zones 333 of the light guide plate 33 corresponding to the special keys have openings 338, and the reflective layer 32 has plural openings 321 corresponding to the top-view light-emitting elements 312. When the light guide plate 33 and the reflective layer 32 are stacked on each other, the top-view light-emitting elements 312 are accommodated within the openings 338 and the openings 321. However, due to the arrangement of the openings 338, the light beams from the side-view light-emitting elements 311 on the lower portion 335 of the light guide plate 33 are possibly unable to be effectively transferred to the first mapping zones 332 on the upper portion 336 of the light guide plate 33. That is, the light amount of the first mapping zones 332 on the upper portion 336 of the light guide plate 33 may be insufficient. For solving this problem, some side-view light-emitting elements 311 of the circuit board 31 are aligned with a middle portion 339 of the light guide plate 33 and located near the corresponding top-view light-emitting elements 312 in order to provide additional light beams. Consequently, the light amount is enhanced.

Figure 6A:
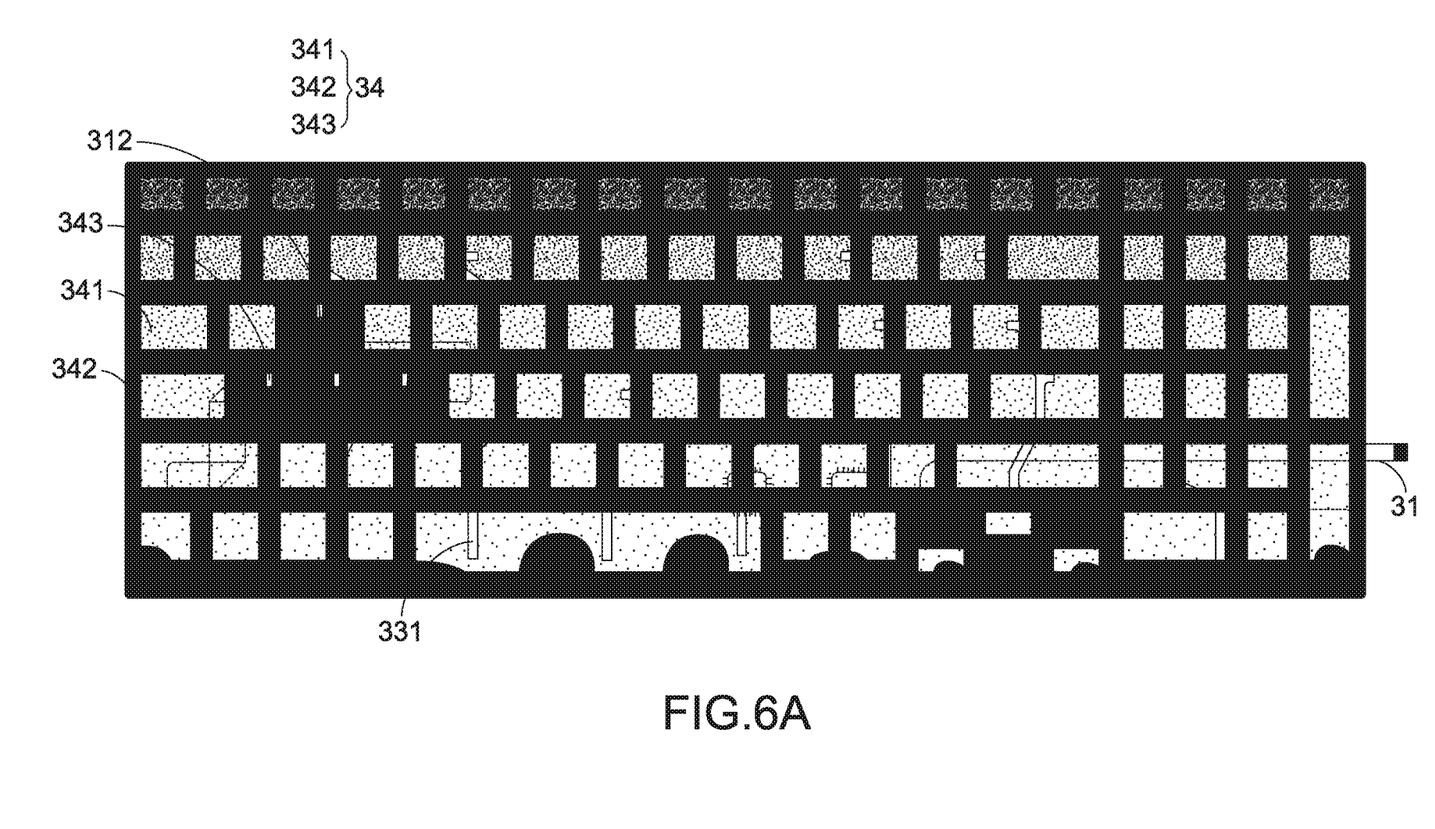
FIG. 6A is a schematic top view illustrating the combination of the circuit board, a reflective layer, the light guide plate and the partial light-shielding layer of the illumination module according to the embodiment of the present invention.
Figure 6B:
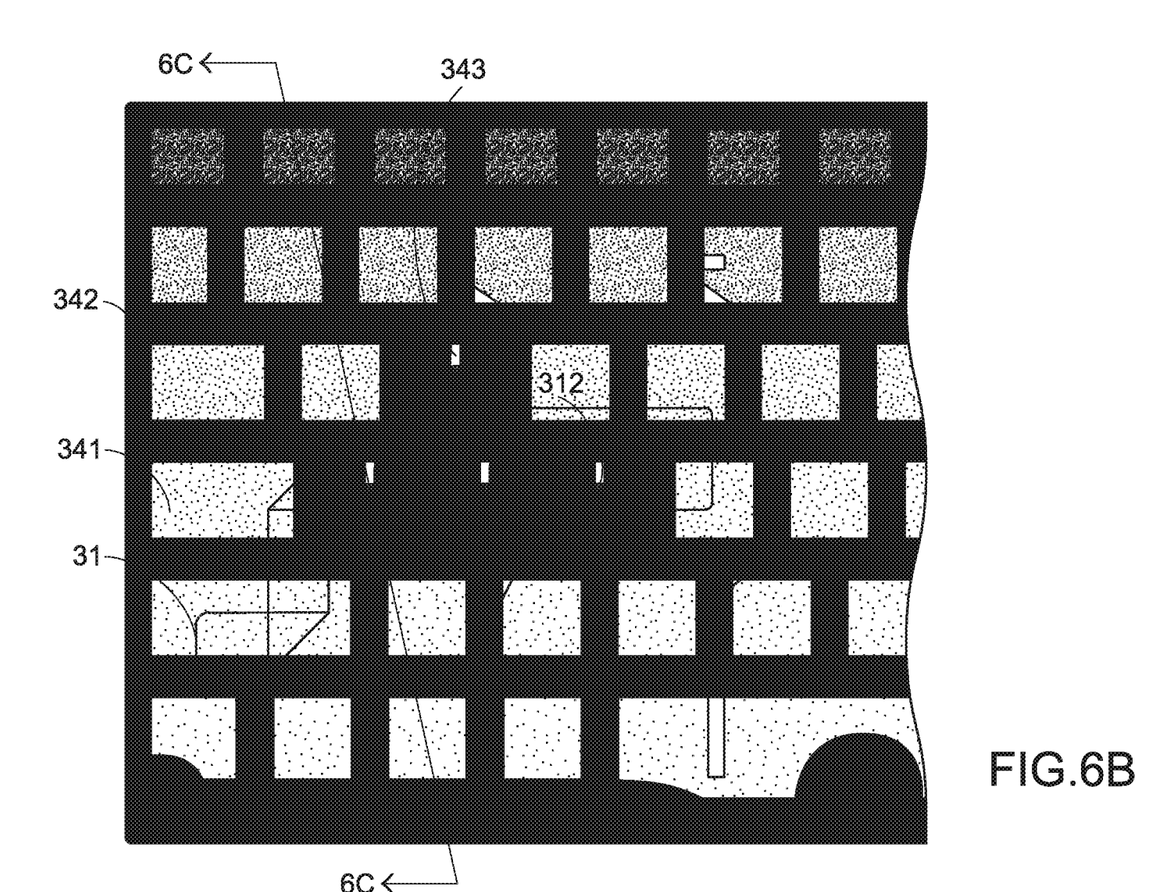
FIG. 6B is schematic top view illustrating an enlarged portion of the combination structure of the illumination module as shown in FIG. 6A.
Figure 6C:
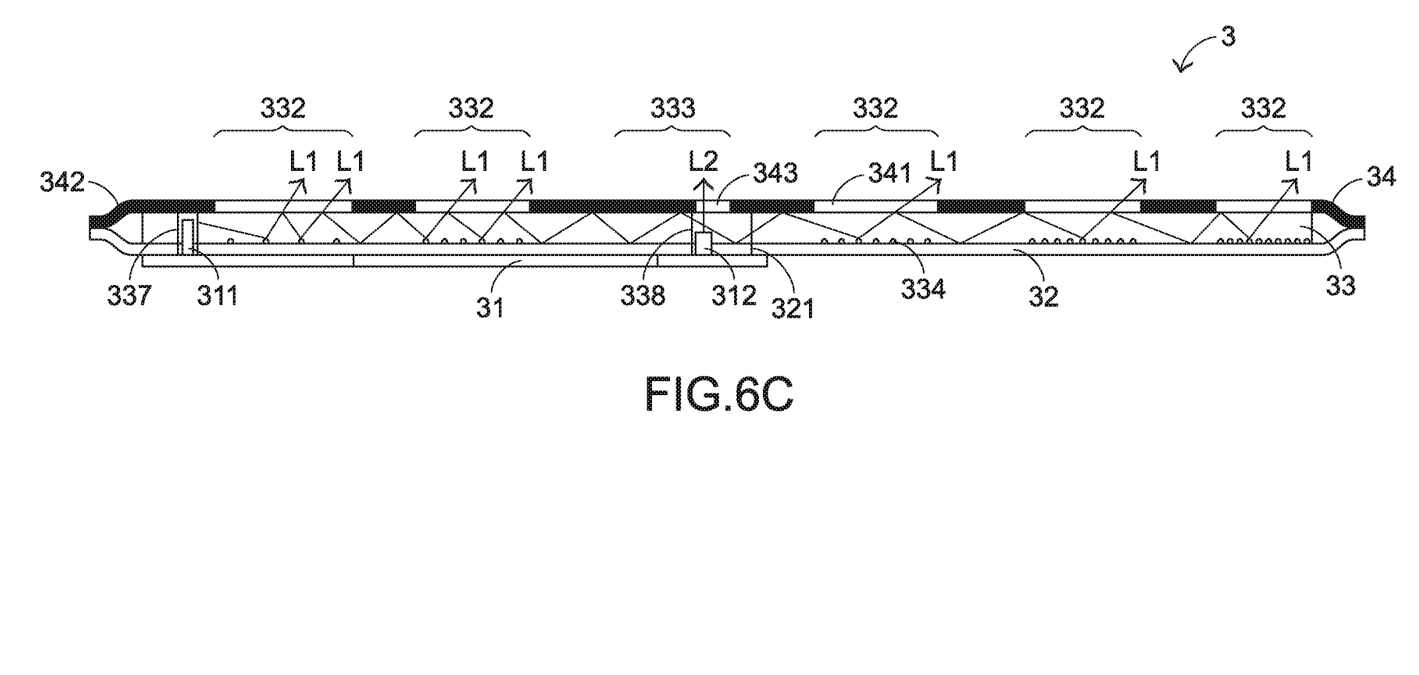
FIG. 6C is a schematic cross-sectional view illustrating the illumination module as shown in FIG. 6B and taken along the line 6C-6C.

FIG. 6A is a schematic top view illustrating the combination of the circuit board, a reflective layer, the light guide plate and the partial light-shielding layer of the illumination module according to the embodiment of the present invention. FIG. 6B is schematic top view illustrating an enlarged portion of the combination structure of the illumination module as shown in FIG. 6A. FIG. 6C is a schematic cross-sectional view illustrating the illumination module as shown in FIG. 6B and taken along the line 6C-6C.

Please refer to FIGS. 1, 2, 6A, 6B and 6C. The illumination module is equipped with the partial-light-shielding layer 34 under the keyboard module 2 and over the light guide plate 33. The partial-light-shielding layer 34 comprises plural light-transmissible regions 341 and plural light-blocking regions 342. The positions of the light-transmissible regions 341 and plural light-blocking regions 342 are determined according to the positions of the keys of the keyboard module 2, the first mapping zones 332 of the light guide plate 33, the second mapping zones 333 of the light guide plate 33 and the light-emitting elements of the circuit board 31. For example, the light-transmissible regions 341 are aligned with the corresponding first mapping zones 332. After the light beams L1 emitted by the side-view light-emitting elements 311 are transferred to the light-extraction structures 334 on the first mapping zones 332, the light beams L1 are extracted and transferred upwardly through the corresponding light-transmissible regions 341, and then the light beams L1 are projected to the first keys 21 (i.e., ordinary keys) of the keyboard module 2. Consequently, the first keys 21 produce the backlight effect.

The light-blocking regions 342 of the partial-light-shielding layer 34 are arranged between the adjacent light-transmissible regions 341. Due to the light-blocking regions 342, the light beams are not leaked out of the seams between adjacent ordinary keys. Consequently, the light leakage problem can be avoided.

In an embodiment, the light-blocking regions 342 of the partial-light-shielding layer 34 are aligned with the second keys 22 (i.e., the special keys) and the second mapping zones 333 of the light guide plate 333. That is, the second mapping zones 333 are covered by the light-blocking regions 342 along the vertical direction. Consequently, when the light beams emitted by the side-view light-emitting elements 311 on the lower portion 31A of the circuit board 31 are transferred through the second mapping zones 333 of the light guide plate 33 under the second keys, the light beams are not extracted (or nearly not extracted). That is, the first light beams can be transferred to the farther positions (or downstream positions) more smoothly and provided to the first keys 21 (i.e., the ordinary keys) at the farther positions. Moreover, the light-blocking regions 342 of the partial-light-shielding layer 34 comprises openings 343 corresponding to the top-view light-emitting elements 312. The top-view light-emitting elements 312 are exposed through the openings 343. Consequently, the light beams from the top-view light-emitting elements 312 can be projected upwardly to the second keys 22 without being blocked. In some other embodiments, the opening 343 of the light-blocking regions 342 are replaced by light-transmissible regions with the sizes identical to the openings.

Please refer to FIGS. 6A, 6B and 6C again. The side-view light-emitting elements 311 on the circuit board 31 are covered by the light-blocking regions 342 of the partial-light-shielding layer 34 along the vertical direction. Since the light beams from the side-view light-emitting elements 311 can be horizontally guided to the light-extraction structures 334 by the light guide plate 33, the backlight can be provided to the other ordinary keys (i.e., the keys other than the special keys).

In the illumination module 3, the light guide plate 33 is clamped between the partial-light-shielding layer 34 and the reflective layer 32. Except for the periphery regions, the partial-light-shielding layer 34 and the reflective layer 32 are attached on each other through the slots 331. In addition, the light beams transferred through the light-guiding zones 33A~33H of the light guide plate 33 can be separated from each other. Consequently, each lighting zone can produce the color cycling effect, the wave spectrum effect, the breathing effect or any other appropriate dynamic lighting effect more easily. In addition, the problem of leaking or losing the light beam can be effectively solved.

Figure 7:
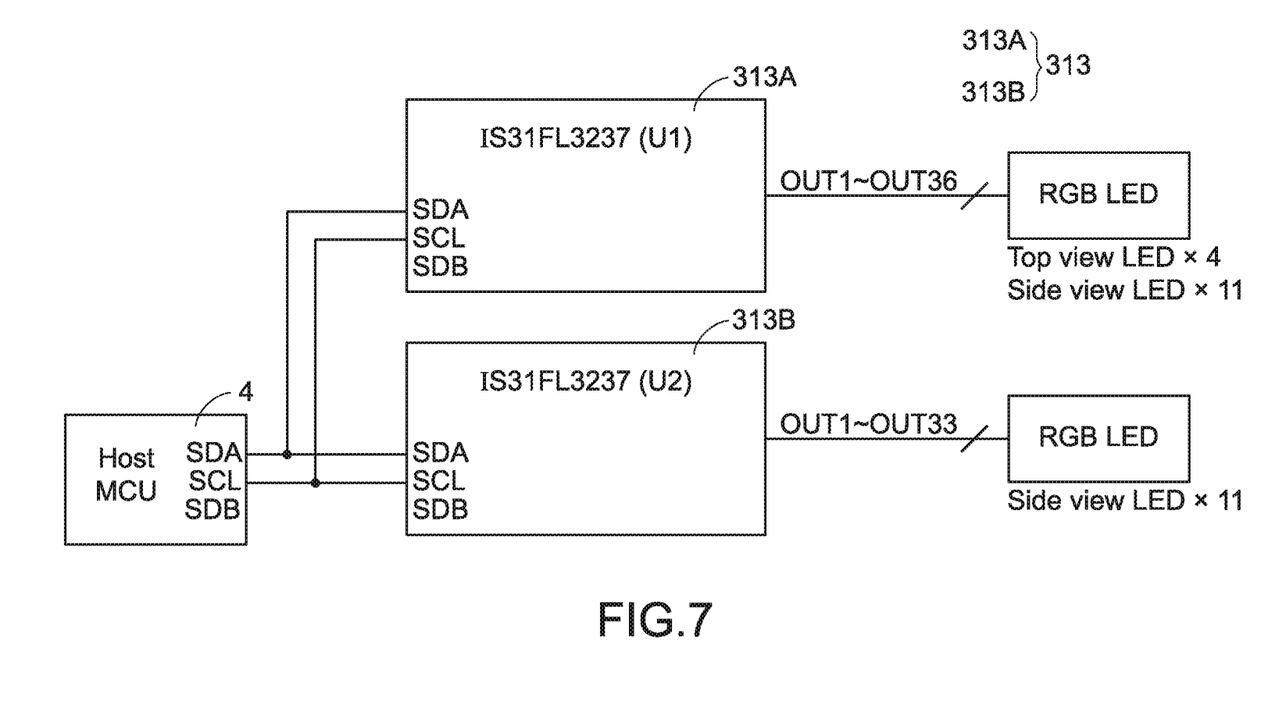
FIG. 7 is a schematic circuit diagram illustrating the relationship between the driving IC, the side-view light-emitting element and the top-view light-emitting element of the illumination module according to the embodiment of the present invention.

FIG. 7 is a schematic circuit diagram illustrating the relationship between the driving IC, the side-view light-emitting element and the top-view light-emitting element of the illumination module according to the embodiment of the present invention. The relationship between the driving ICs 313, the side-view light-emitting elements 311 and the top-view light-emitting elements 312 on the circuit board 31 are shown in FIG. 7. In this embodiment, two ISSI 3237 driving ICs 313A and 313B are installed on the circuit board 31 to control 22 side-view light-emitting elements 311 and 4 top-view light-emitting elements 312. That is, 11 side-view light-emitting elements 311 and 4 top-view light-emitting elements 312 are controlled by the driving IC 313A. The driving IC 313B is connected with the driving IC 313A in parallel. The other 11 side-view light-emitting elements 311 are controlled by the driving IC 313B. Moreover, the driving IC 313A and the driving IC 313B are connected with a microcontroller (MCU) 4 of a keyboard motherboard (or a hot terminal) through a signal terminal or a connecting wire.

For achieving the light optimization, the current distribution should be taken into consideration. For example, the light loss of the side-view light-emitting element is higher. In case that the monochromatic LED is used, the distributed current is 20~30 mA. In case that the three-chip LED or the four-chip LED is used, the distributed current is 60~90 mA.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
a keyboard module comprising plural first keys and at least one second key; and
an illumination module located under the keyboard module, and comprising:
a light guide plate comprising plural first mapping zones and at least one second mapping zone, wherein the first mapping zones are located under the corresponding first keys, and the at least one second mapping zone is located under the at least one second key, wherein the second mapping zone comprises an opening; and
a circuit board, wherein plural side-view light-emitting elements and at least one top-view light-emitting element are installed on the circuit board, wherein each side-view light-emitting element emits a first light beam, and the top-view light-emitting element emits a second light beam, wherein the first light beam is extracted through the corresponding first mapping zone and transferred to the corresponding first key, and the second light beam is directly transferred to the second key, the top-view light-emitting element is accommodated within the opening, and at least on side-view light-emitting element is aligned with a middle portion of the light guide plate and located near the top-view light-emitting element,
wherein the light guide plate comprises plural slots, and the light guide plate is divided into plural light-guiding zones through the slots,
wherein an upper portion or a lower portion of every two adjacent ones of the light-guiding zones are coupled with each other,
wherein each light-guiding zone is aligned with at least one of the plural side-view light-emitting elements.

2. The keyboard device according to claim 1, wherein the circuit board is located under the light guide plate, and the light guide plate comprises plural openings, wherein at least one side-view light-emitting element and the at least one top-view light-emitting element are accommodated within the corresponding openings.

3. The keyboard device according to claim 1, wherein each first mapping zone of the light guide plate is equipped with plural light-extraction structures, wherein a number, a component density or a depth of the light-extraction structures is adjusted according to a distance between the first mapping zone and the side-view light-emitting element.

4. The keyboard device according to claim 3, wherein the light-extraction structures are light-guiding dots or microstructures.

5. The keyboard device according to claim 1, wherein each first mapping zone of the light guide plate is equipped with plural light-extraction structures, wherein in every two adjacent first mapping zones, the first mapping zone farther from the corresponding side-view light-emitting element has a larger number, a larger component density or a larger depth of the light-extraction structures.

6. The keyboard device according to claim 5, wherein the light-extraction structures are light-guiding dots or microstructures.

7. The keyboard device according to claim 1, wherein the second mapping zone of the light guide plate is not equipped with light-extraction structures.

8. The keyboard device according to claim 1, wherein the circuit board further comprises at least one driving IC, and currents and PWM signals corresponding to the plural side-view light-emitting element and the at least one top-view light-emitting element are controlled by the at least one driving IC.

9. The keyboard device according to claim 1, wherein the at least one second key includes four keys "W", "A", "S" and "D".

10. The keyboard device according to claim 9, wherein four second mapping zones of the light guide plate corresponding to the four keys "W", "A", "S" and "D" belong to two of the plural light-guiding zones through one of the plural slots.

11. The keyboard device according to claim 1, wherein three second mapping zones of the light guide plate corresponding to three keys "W", "A" and "D" are located near one of the plural slots.

12. The keyboard device according to claim 1, wherein the keyboard further comprises a partial-light-shielding layer between the light guide plate and the keyboard module, and the partial-light-shielding layer comprises at least one light-transmissible region and at least one light-blocking region, wherein the at least one second mapping region is covered by the at least one light-blocking region along a vertical direction.

13. The keyboard device according to claim 12, wherein the light-blocking region comprises at least one opening, and the at least one top-view light-emitting element is exposed outside the at least one opening.

14. The keyboard device according to claim 12, wherein the keyboard device further comprises a reflective layer, wherein the light guide plate is clamped between the light-shielding layer and the reflective layer, and the light-shielding layer and the reflective layer are attached on each other through the slots.

15. The keyboard device according to claim 1, wherein the keyboard device further comprises a partial-light-shielding layer between the light guide plate and the keyboard module, and the partial-light-shielding layer comprises at least one light-transmissible region and at least one light-blocking region, wherein the at least one side-view light-emitting element is covered by the light-blocking region along a vertical direction.

16. The keyboard device according to claim 15, wherein the keyboard device further comprises a reflective layer, wherein the light guide plate is clamped between the light-shielding layer and the reflective layer, and the light-shielding layer and the reflective layer are attached on each other through the slots.

17. An illumination module for a keyboard module, the keyboard module comprising plural first keys and at least one second key, the illumination module comprising:
a partial-light-shielding layer comprising at least one light-transmissible region and at least one light-blocking region;
a light guide plate located under the partial light-shielding layer, and comprising plural first mapping zones and at least one second mapping zone, wherein the light guide plate comprises plural first openings and at least one second opening;
a reflective layer located under the light guide plate, and comprising plural second openings; and
a circuit board located under the reflective layer, wherein plural side-view light-emitting elements and at least one top-view light-emitting element are installed on the circuit board, and the at least one side-view light-emitting element and the at least one top-view light-emitting element are accommodated within the corresponding first openings and the corresponding second opening, wherein each side-view light-emitting element emits a first light beam, and the top-view light-emitting element emits a second light beam, wherein the first light beam is guided by the light guide plate, transferred through the first mapping zone and the light-transmissible region, and transferred to the corresponding first key, and the second light beam is transferred to the second key, and at least on side-view light-emitting element is aligned with a middle portion of the light guide plate and located near the top-view light-emitting element,
wherein the light guide plate comprises plural slots, and the light guide plate is divided into plural light-guiding zones through the slots,
wherein an upper portion or a lower portion of every two adjacent ones of the light-guiding zones are coupled with each other,
wherein each light-guiding zone is aligned with at least one of the plural side-view light-emitting elements.

18. The illumination module according to claim 17, wherein each first mapping zone of the light guide plate is equipped with plural light-extraction structures, and the light-extraction structures are light-guiding dots or microstructures, wherein the second mapping zone of the light guide plate is not equipped with light-extraction structures.

19. The illumination module according to claim 17, wherein the at least one side-view light-emitting element is covered by the light-blocking region along a vertical direction.

20. The illumination module according to claim 17, wherein the at least one second mapping region is covered by the at least one light-blocking region along a vertical direction.

21. The illumination module according to claim 17, wherein the light-blocking region comprises at least one third opening, and the at least one light-blocking region is exposed outside the at least one first opening, the at least one second opening and the at least one third opening.

22. The illumination module according to claim 17, wherein the light-shielding layer and the reflective layer are attached on each other through the slots.

23. The illumination module according to claim 17, wherein the circuit board further comprises at least one driving IC, and currents and PWM signals corresponding to the plural side-view light-emitting elements and the at least one top-view light-emitting element are controlled by the at least one driving IC.

24. The illumination module according to claim 17, wherein the at least one second key includes four keys "W", "A", "S" and "D".

* * * * *